United States Patent
Rhee

(10) Patent No.: US 12,281,705 B2
(45) Date of Patent: Apr. 22, 2025

(54) ROTATING-SHAFT SEAL AND VACUUM TYPE COMPONENT TRANSFER APPARATUS USING THE SAME

(71) Applicant: SEALINK CORP., Seoul (KR)

(72) Inventor: Hee Jang Rhee, Gunpo-si (KR)

(73) Assignee: SEALINK CORP., Seoul (KR)

( * ) Notice: Subject to any disclaimer, the term of this patent is extended or adjusted under 35 U.S.C. 154(b) by 906 days.

(21) Appl. No.: 17/380,332

(22) Filed: Jul. 20, 2021

(65) Prior Publication Data
US 2021/0396318 A1    Dec. 23, 2021

Related U.S. Application Data

(63) Continuation of application No. PCT/KR2020/018246, filed on Dec. 14, 2020.

(30) Foreign Application Priority Data

Jun. 23, 2020 (KR) .................. 10-2020-0076583

(51) Int. Cl.
*F16J 15/43* (2006.01)
*B65G 39/09* (2006.01)

(52) U.S. Cl.
CPC .............. *F16J 15/43* (2013.01); *B65G 39/09* (2013.01)

(58) Field of Classification Search
CPC . H05K 2203/0195; B25J 15/0616–065; B65H 2406/362; B65H 2406/3622; B65H 2406/361; B65H 2406/331; B65H 20/12; Y10T 29/53191; D21F 3/10; F16J 15/002; F16J 15/16; F16J 15/164

USPC .................... 269/21; 279/3; 226/95
See application file for complete search history.

(56) References Cited

U.S. PATENT DOCUMENTS

| | | | | |
|---|---|---|---|---|
| 2,312,519 A | * | 3/1943 | Berry ..................... | D21F 3/10 |
| | | | | 162/371 |
| 2,366,935 A | * | 1/1945 | Schmid ................. | B25B 11/005 |
| | | | | 269/21 |
| 2,567,387 A | * | 9/1951 | Link ...................... | H01G 13/02 |
| | | | | 242/532.2 |
| 2,575,631 A | * | 11/1951 | Link ...................... | H01G 13/02 |
| | | | | 269/21 |

(Continued)

FOREIGN PATENT DOCUMENTS

CN      207175026 U      4/2018
EP      2514698 A2  *   10/2012  ............ B65H 27/00

(Continued)

*Primary Examiner* — Jason L Vaughan
(74) *Attorney, Agent, or Firm* — Dinsmore & Shohl LLP; Yongsok Choi, Esq.

(57) ABSTRACT

Provided is a component transfer device. The component transfer device includes: a hollow housing provided with, along an outer diameter thereof, one or more fluid ports forming vacuum or pressure; a shaft provided rotatably with respect to the housing inside the housing, and provided with, on an outer diameter thereof, a plurality of communication holes for selectively communicating with the one or more fluid ports according to a rotation location; and a roller fixed to the shaft and rotating together with the shaft, and provided with, on an outer diameter thereof, a plurality of roller holes communicating in response to locations of the plurality of communication holes.

10 Claims, 6 Drawing Sheets

(56) References Cited

U.S. PATENT DOCUMENTS

| | | | | |
|---|---|---|---|---|
| 3,289,905 | A | * | 12/1966 | Pitt ..................... G11B 15/285 |
| | | | | 251/129.1 |
| 3,537,830 | A | * | 11/1970 | Lee ......................... B24B 41/06 |
| | | | | 269/21 |
| 4,145,040 | A | * | 3/1979 | Huber .................... B65H 5/226 |
| | | | | 271/276 |
| 7,552,919 | B2 | * | 6/2009 | Lisena ..................... B65H 3/10 |
| | | | | 271/107 |
| 9,315,331 | B2 | * | 4/2016 | Gieser ................... B41F 21/102 |
| 9,796,546 | B1 | * | 10/2017 | LeFevre ................. B65H 5/224 |
| 2012/0312446 | A1 | * | 12/2012 | Hood .................... B65H 5/222 |
| | | | | 156/60 |

FOREIGN PATENT DOCUMENTS

| | | |
|---|---|---|
| JP | S5931245 A | 2/1984 |
| JP | H05262445 A | 10/1993 |
| JP | H0619378 A | 1/1994 |
| JP | 2003072997 A | 3/2003 |
| JP | 2007253321 A | 10/2007 |
| JP | 2019517970 A | 6/2019 |
| KR | 101421608 B1 | 7/2014 |
| KR | 1020190015475 A | 2/2019 |

\* cited by examiner

ROTATING-SHAFT SEAL AND VACUUM TYPE COMPONENT TRANSFER APPARATUS USING THE SAME

CROSS-REFERENCE TO RELATED APPLICATIONS

This application is a continuation of International Patent Application No. PCT/KR2020/018246 filed on Dec. 14, 2020 which claims priority to Korean Patent Application No. 10-2020-0076583 filed on Jun. 23, 2020, the entire contents of which are herein incorporated by reference.

TECHNICAL FIELD

The disclosure relates to a rotation shaft seal and a component transfer device using the same, and more particularly, to a rotation shaft seal capable of performing sealing between a shaft and a housing while isolatedly sealing a plurality of areas of the shaft in a circumferential direction, and a component transfer device using the same.

BACKGROUND ART

Smart phones, televisions (TVs), vehicles, computers, and the like use various small-sized components, such as transistors, switching devices, and capacitors. Adsorption devices using a vacuum method may be used to transfer a multi-layered ceramic capacitor (MLCC) or various small-sized chips, and a component in a sheet form. In particular, vacuum adsorption devices may be used to wind a pole plate with respect to secondary battery manufacture, or adsorb a component by using vacuum and then transfer the component to another location while a plurality of small-sized components are densely aligned on a tray. Also, adsorption devices may be used to start winding at a determined location while maintaining uniform tension on a thin-film sheet and separate a wound sheet at a determined location, as in roll-to-roll printing.

With respect to transferring such a small-sized component or a sheet form, it is required to accurately adsorb a component or sheet at a desired location by using vacuum, and separate an attached component or sheet at a desired location by using pressure.

SUMMARY

Technical Problem

Provided are a component transfer device capable of transferring a component by accurately adsorbing the component using vacuum, and a rotation shaft seal used in the same.

Also, provided are a component transfer device that may be used to transfer a multi-layered ceramic capacitor (MLCC) or various chips by using vacuum adsorption, or to adsorb and transfer a component in a sheet form, such as a secondary battery finishing tape, and a rotation shaft seal used in the same.

The problems to be solved in embodiments are not limited to those mentioned above, and other problems that are not mentioned may be clearly understood by one of ordinary skill in the art from the following description.

Solution to Problem

According to an embodiment of the disclosure, a component transfer device includes: a hollow housing provided with, along an outer diameter thereof, one or more fluid ports forming vacuum or pressure; a shaft provided rotatably with respect to the housing inside the housing, and provided with, on an outer diameter thereof, a plurality of communication holes for selectively communicating with the one or more fluid ports according to a rotation location; and a roller fixed to the shaft and rotating together with the shaft, and provided with, on an outer diameter thereof, a plurality of roller holes communicating in response to locations of the plurality of communication holes, wherein a component is adsorbed or separated according to rotation of the roller.

The component transfer device may further include a bearing for rotatably supporting the shaft in the housing.

The one or more fluid ports may include one or more pressure ports and one or more vacuum ports, a roller hole of the roller communicating with the one or more vacuum ports may adsorb the component to the roller, and a roller hole of the roller communicating with the one or more pressure port may separate the component from the roller via pressure.

The housing may include an area expansion groove communicating with the one or more pressure ports or the one or more vacuum ports and provided along an inner circumferential surface of the housing.

A length of the area expansion groove along the inner circumferential surface of the housing may be determined according to a location and length of a portion adsorbing the component.

A rotation shaft seal may be provided between the shaft and the housing such that pressure is not leaked through the one or more fluid ports.

The rotation shaft seal may be fixedly provided at an inner diameter of the housing and include: a pair of circumferential direction seals sealing a space between the housing and the shaft; and an axial direction seal provided in an axial direction of the shaft to be perpendicular to the pair of circumferential direction seals between the pair of circumferential direction seals, and sealing the one or more pressure ports and the one or more vacuum ports such as not to communicate with each other.

The pair of circumferential direction seals and the axial direction seal may be formed of a plastic material or a rubber material.

The pair of circumferential direction seals and the axial direction seal may be integrally molded.

The pair of circumferential direction seals may include a seal main body and an elastic member inserted into the seal main body.

The elastic member may be provided on one surface of the seal main body contacting the housing such that the pair of circumferential direction seals pressurize the shaft.

At least one of the pair of circumferential direction seals and the axial direction seal may be provided as a mechanical seal or a magnet.

According to an embodiment of the disclosure, a rotation shaft seal for sealing a space between a rotation shaft and a housing accommodating the rotation shaft, includes: a pair of circumferential direction seals for sealing the space between the housing and the shaft; and an axial direction seal provided in an axial direction of the shaft to be perpendicular to the pair of circumferential direction seals between the pair of circumferential direction seals, and separately sealing the shaft in a plurality of areas in a circumferential direction.

The pair of circumferential direction seals and the axial direction seal may be formed of a plastic material or a rubber material.

The pair of circumferential direction seals and the axial direction seal may be integrally molded.

The pair of circumferential direction seals may include a seal main body and an elastic member inserted into the seal main body.

The elastic member may be provided on one surface of the seal main body contacting the housing such that the pair of circumferential direction seals pressurize the shaft.

At least one of the pair of circumferential direction seals and the axial direction seal may be provided as a mechanical seal or a magnet.

Advantageous Effects of Disclosure

According to a component transfer device according to an embodiment of the disclosure, a component can be accurately transferred by using vacuum adsorption.

Also, a multi-layered ceramic capacitor (MLCC) or various chips can be precisely transferred by using vacuum adsorption, or a component in a sheet form, such as a secondary battery finishing tape, can be adsorbed without a wrinkle and precisely transferred.

According to a rotation shaft seal according to an embodiment of the disclosure, while a shaft is rotating inside a housing, a space between the shaft and the housing can be sealed from the outside while areas of the space between the shaft and the housing can be separately sealed such that the areas can be divided into a vacuum area or a pressurized area.

DETAILED DESCRIPTION

Figure 1:
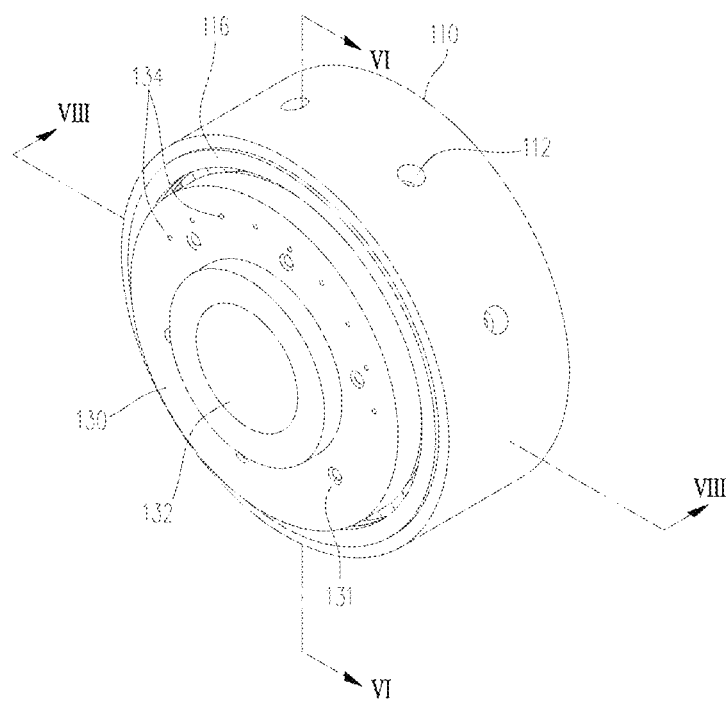
FIG. 1 is a combined perspective view of a housing and a shaft of a component transfer device, according to an embodiment of the disclosure.

Hereinafter, embodiments of the disclosure will be described in detail with reference to the accompanying drawings such that one of ordinary skill in the art may easily implement the disclosure. However, the disclosure may be implemented in various different forms and is not limited to embodiments described herein. In the drawings, parts irrelevant to the description are omitted to clearly describe embodiments of the disclosure.

Also, the terms used in the present specification are only used to describe specific embodiments, and are not intended to limit the disclosure. An expression used in the singular may encompass the expression in the plural, unless it has a clearly different meaning in the context.

In the present specification, it is to be understood that terms such as "including", "having", "comprising", etc., are intended to indicate the existence of the features, numbers, steps, actions, components, parts, or combinations thereof disclosed in the specification, and are not intended to preclude the possibility that one or more other features, numbers, steps, operations, components, parts, or combinations thereof may exist or may be added.

The following embodiments are provided for clearer description to one of ordinary skill in the art, and shapes and sizes of the elements in the drawing may be exaggerated for a clearer description.

Hereinafter, embodiments of the disclosure will be described in detail with reference to accompanying drawings.

Figure 2:
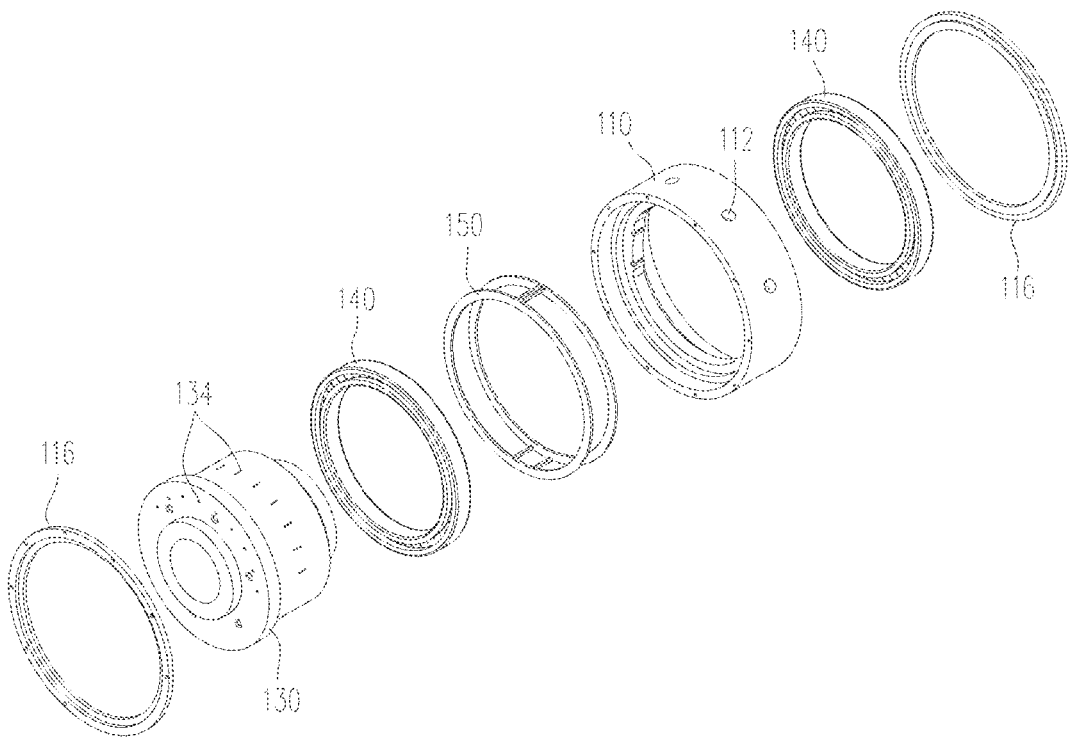
FIG. 2 is an exploded perspective view of the housing and the shaft of FIG. 1.
Figure 3:
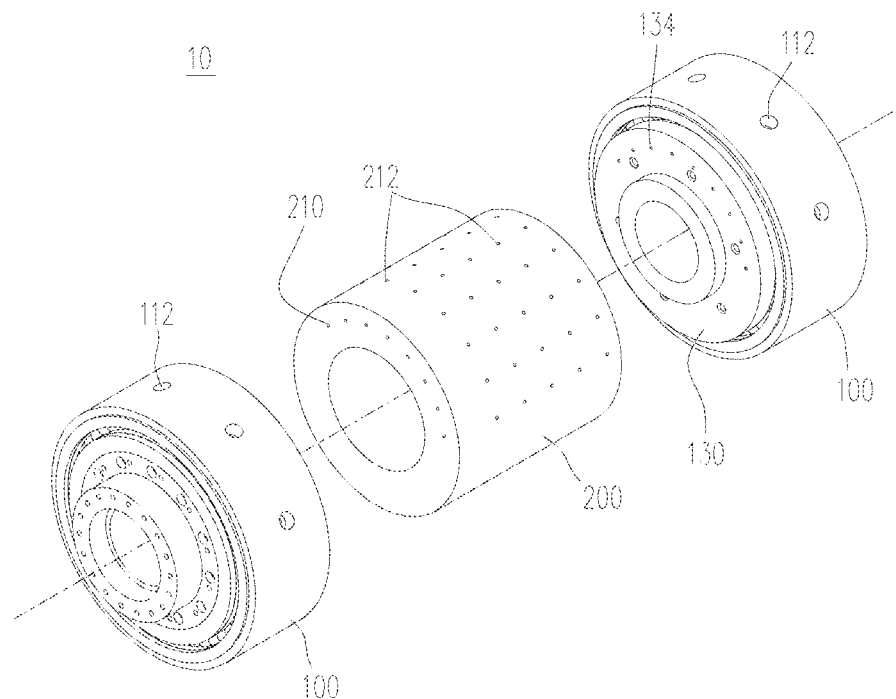
FIG. 3 is a perspective view of a component transfer device according to an embodiment of the disclosure.
Figure 4:
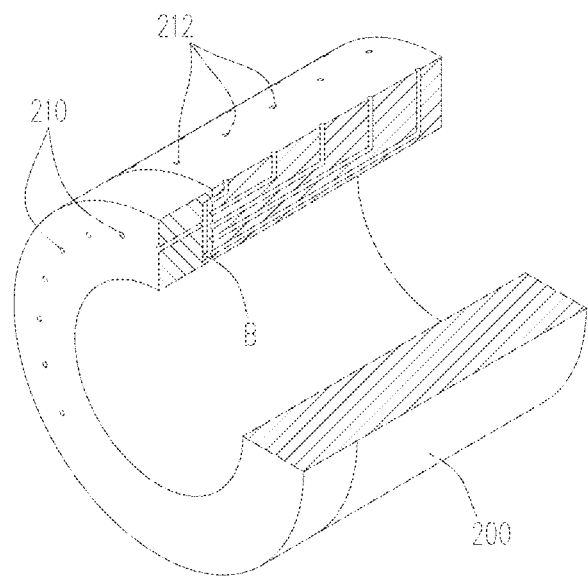
FIG. 4 is a view for describing a roller portion of a vacuum type component transfer device, according to an embodiment of the disclosure.
Figure 5:
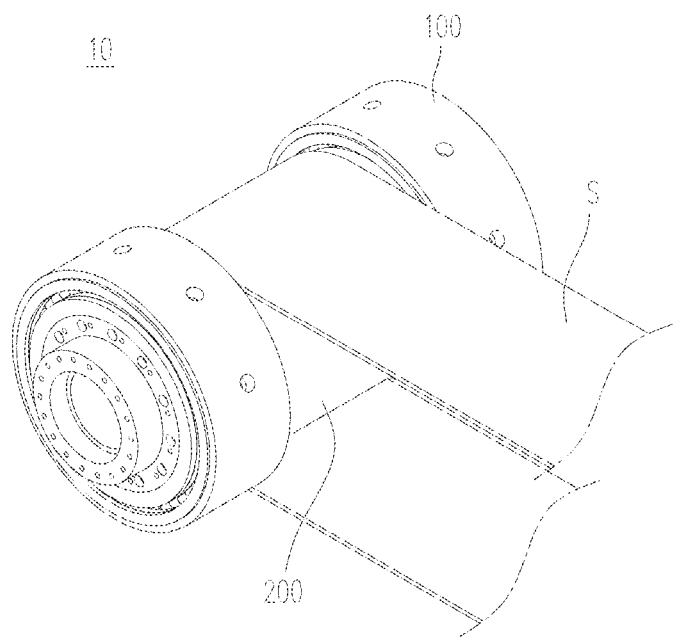
FIG. 5 is a view showing a component in a sheet form being adsorbed and transferred by using a component transfer device, according to an embodiment of the disclosure.
Figure 6:
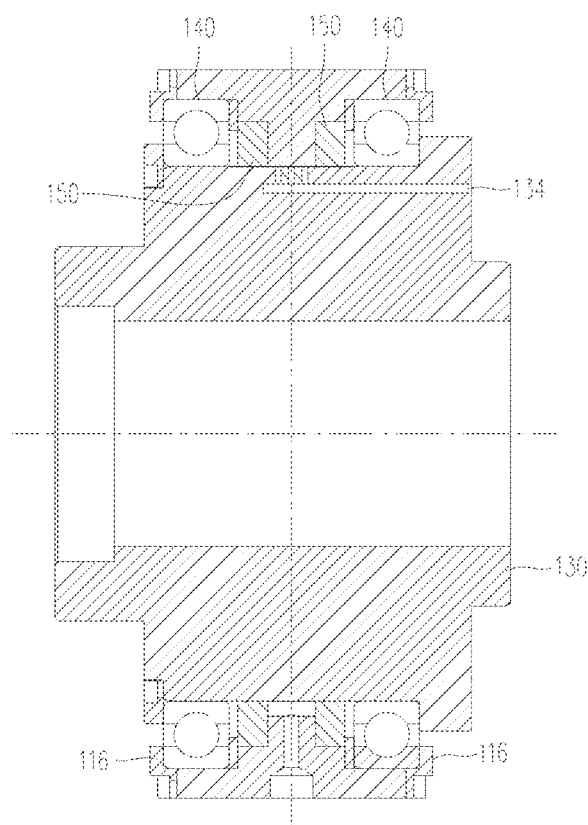
FIG. 6 is a cross-sectional view taken along a line VI-VI of the housing and the shaft of FIG. 1.
Figure 7:
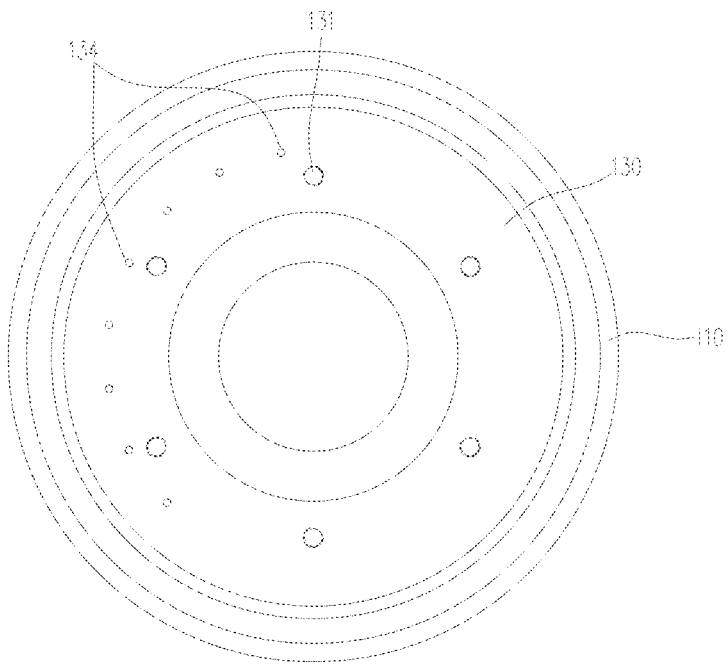
FIG. 7 is a rear view of the housing and the shaft of FIG. 1.
Figure 8:
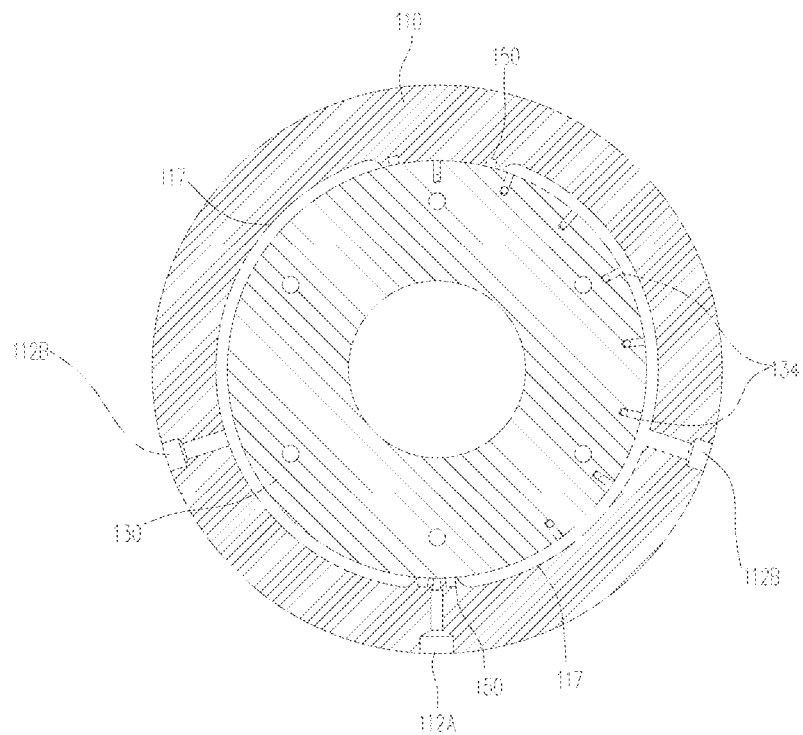
FIG. 8 is a cross-sectional view of the housing and the shaft taken along a line VIII-VIII of FIG. 1.
Figure 9:
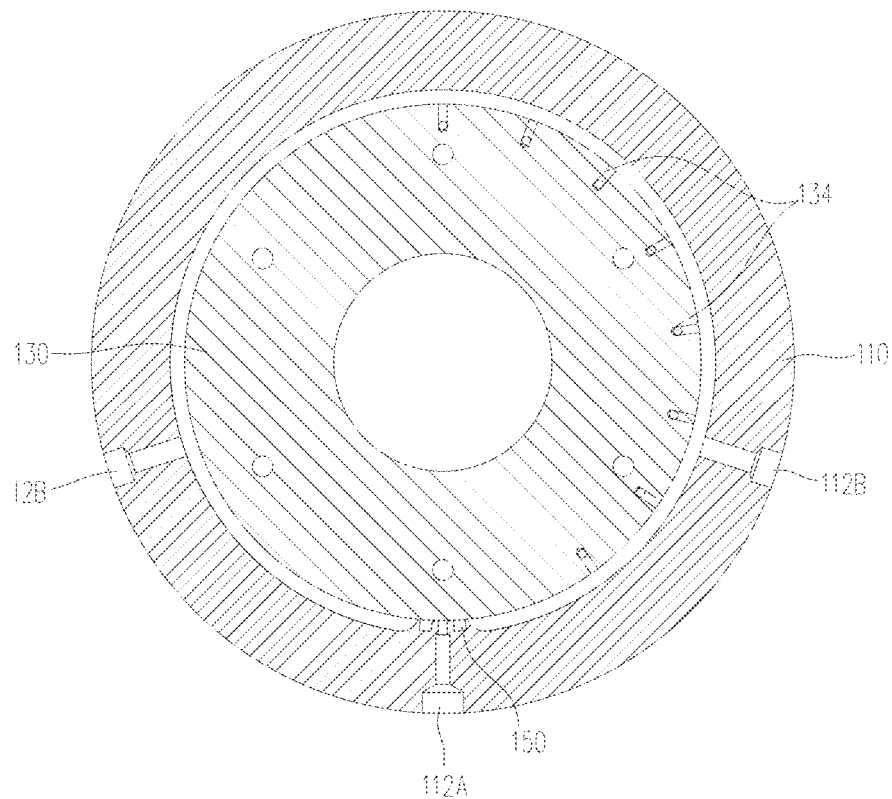
FIG. 9 is a cross-sectional view of a housing and a shaft, according to another embodiment of the disclosure.

FIG. 1 is a combined perspective view of a housing and a shaft of a component transfer device, according to an embodiment of the disclosure, and FIG. 2 is an exploded perspective view of the housing and the shaft of FIG. 1. FIG. 3 is a perspective view of a component transfer device according to an embodiment of the disclosure, and FIG. 4 is a view for describing a roller portion of a vacuum type component transfer device, according to an embodiment of the disclosure. FIG. 5 is a view showing a component in a sheet form being adsorbed and transferred by using a component transfer device, according to an embodiment of the disclosure, and FIG. 6 is a cross-sectional view taken along a line VI-VI of the housing and the shaft of FIG. 1. FIG. 7 is a rear view of the housing and the shaft of FIG. 1, and FIG. 8 is a cross-sectional view of the housing and the shaft taken along a line VIII-VIII of FIG. 1. FIG. 9 is a cross-sectional view of a housing and a shaft, according to another embodiment of the disclosure.

Referring to FIGS. 1 through 9, a component transfer device 10 according to an embodiment of the disclosure may be provided to transfer a component in a certain shape or a component in a sheet form, by using adsorption force by vacuum. For example, the component transfer device 10 may be used to transfer a multi-layered ceramic capacitor (MLCC) or various chips, or may be used to adsorb and transfer a component in a sheet form, such as a secondary battery finishing tape.

The component transfer device 10 may include a hollow housing 110, a shaft 130 provided rotatably with respect to the housing 110 inside the hollow housing 110, and a roller 200 fixed to the shaft 130 and rotating together with the shaft 130.

One or more fluid ports 112 may be provided at an outer diameter of the housing 110. The fluid port 112 may be connected to an external vacuum pump (not shown) or pressure pump (not shown), thereby pressurizing (pressure port) the inside of the fluid port 112 or forming vacuum (vacuum port). The number of fluid ports 112 may change depending on a size of the housing 110, an angle for adsorbing or separating a component, an adsorption force required to adsorb a component, or the like. Also, as shown in FIG. 8, an area expansion groove 117 communicating with a pressure port 112A or vacuum port 112B may be provided on an inner circumferential surface of the housing 110. The area expansion groove 117 may expand a pressure area or vacuum area by an area corresponding to a length of the area expansion groove 117, not only by a location where the pressure port 112A or vacuum port 112B is provided. In the present embodiment, the area expansion groove 117 communicates only with the vacuum port 112B, but according to an embodiment, an area expansion groove communicating with the pressure port 112A may be provided. The length of the area expansion groove 117 may be determined according to locations and sizes of areas of a portion adsorbing a component and a portion discharging a component.

The shaft 130 may be rotatably supported by a bearing 140 inside the housing 110. In the present embodiment, the shaft 130 may also be formed hollow, or a solid-core type shaft may be provided. A pair of the bearings 140 may be provided on both sides to support the shaft 130. A cover 116 for fixing the bearing 140 may be provided on both sides of the housing 110. A plurality of communication holes 134 may be provided at an outer diameter of the shaft 130. The communication hole 134 may selectively communicate with the fluid port 112, according to a relative location of the communication hole 134 with respect to the housing 110 as the shaft 130 rotates. Sizes, intervals, and number of the communication holes 134 may be differently set depending on a number or sizes of components being transferred by being attached to the roller 200 described below, or depending on precision of attachment required for preventing a wrinkle when a component in a sheet form is attached. In addition, the communication holes 134 may not be provided throughout the outer diameter of the shaft 130, i.e., over 360°, but may be provided within a range corresponding to a certain angle. Accordingly, an area to which a component or sheet is adsorbed may be determined. Meanwhile, the communication hole 134 may be bent 90° from the outer diameter of the shaft 130 and extend in an axial direction in a tubular shape communicating up to one end of the shaft.

Referring to FIGS. 3 through 5, the roller 200 may rotate together with the shaft 130 by being fixed to the shaft 130 via bolt combination or the like. In this regard, a plurality of fastening holes 131 may be provided at the shaft 130.

A plurality of communication pipes 210 corresponding to locations of the plurality of communication holes 134 of the shaft 130, respectively, may be provided on both sides or one side of the roller 200 when being combined with the shaft 130. In FIG. 4, the communication pipes 210 are provided only on one side surface, but the communication pipes 210 may be provided on both side surfaces. Each communication pipe 210 may be branched into a plurality of communication pipes via an expanding portion B such that the branched communication pipes each communicate with a roller hole 212. The roller hole 212 may be provided on an outer diameter of the roller 200. In other words, the roller holes 212 may not be provided throughout the outer diameter of the roller 200 in 360°, but may be provided within a range corresponding to a certain angle. For example, the roller holes 212 may be provided at locations corresponding to the communication holes 134, respectively, only within a range of an angle where the communication holes 134 are formed. As the shaft 130 rotates within the housing 110, the communication holes 134 of the shaft 130 may sequentially communicate with the plurality of fluid ports 112 of the housing 110. At this time, as shown in FIG. 8, the fluid port 112 may be one of the pressure port 112A where pressure is formed or the vacuum port 112B where vacuum is formed. According to an arrangement and combination of the fluid ports 112, the communication hole 134 of the shaft 130 may be vacuumed or pressurized. Also, because the communication hole 134 and the roller hole 212 of the roller 200 communicate with each other to correspond to each other, the roller hole 212 of the roller 200 may be vacuumed or pressurized by the fluid port 112 according to a rotation angle, as the roller 200 rotates with respect to the housing 110. Thus, according to rotation of the roller 200, when the roller hole 212 communicates with the vacuum port 112B, a component, such as a sheet, may be attached to the roller hole 212, and when the roller hole 212 communicates with the pressure port 112A, the component may be separated from the roller 200 by pressure of the roller hole 212.

In the embodiment shown in FIG. 8, one pressure port 112A and eight vacuum ports 112B are provided, wherein one pressure port 112A is provided in a six o'clock direction and the vacuum ports 112B are arranged one by one each on left and right areas based on the one pressure port 112A. The pressure port 112A and the vacuum ports 112B do not communicate with each other, and the vacuum ports 112B in the left area and the vacuum ports 112B in the right area may be arranged such as not to communicate with each other. Accordingly, among the plurality of communication holes 134, as the shaft 130 rotates in a clockwise direction in the housing 110, for example, the plurality of communication holes 134 that were communicating with the vacuum ports 112B provided on a right side in FIG. 8 may communicate with the pressure port 112A sequentially, and the roller hole 212 of the roller 200 communicating with the communication hole 134 communicating with the pressure port 112A may be pressurized. Consequently, a component or sheet attached to the roller hole 212 may be separated. Thereafter, as the shaft 130 further rotates in the clockwise direction, the communication hole 134 that was communicating with the pressure port 112A communicates with the vacuum ports 112B provided on a left side in FIG. 8, and thus the roller hole 212 of the roller 200 communicating with the corresponding communication hole 134 may be vacuumed again.

On the other hand, according to another embodiment of the disclosure shown in FIG. 9, the vacuum ports 112B in an area other than a portion where the one pressure port 112A is provided in the 6 o'clock direction may be configured to fully communicate with each other. In this case, it is important to maintain pressure or vacuum between the housing 110 and the shaft 130, formed via the pressure port 112A or vacuum port 112B, without leakage. Accordingly, in the present embodiment, a rotation shaft seal 150 sealing the space between the shaft 130 and the housing 110 from the outside may be provided.

Hereinafter, a rotation shaft seal according to an embodiment of the disclosure will be described in detail.

Figure 10:
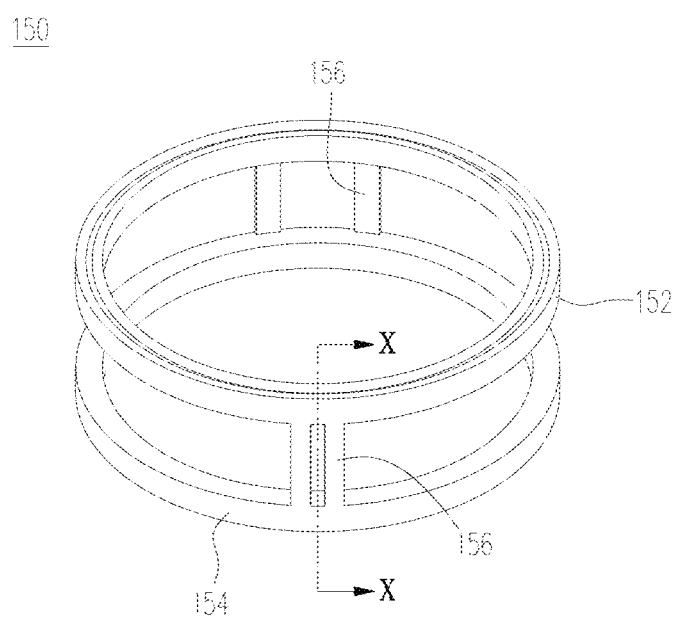
FIG. 10 is a view showing a rotation shaft seal according to an embodiment of the disclosure.
Figure 11:
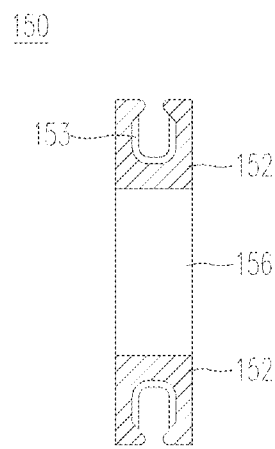
FIG. 11 is a cross-sectional view taken along a line X-X of FIG. 10.

FIG. 10 is a view showing a rotation shaft seal according to an embodiment of the disclosure, and FIG. 11 is a cross-sectional view taken along a line X-X of FIG. 10.

Referring to FIGS. 10 and 11, the rotation shaft seal 150 according to an embodiment of the disclosure is provided to seal between the shaft 130 and the housing 110 while the shaft 130 performs a rotation in the housing 110. In the present embodiment, the rotation shaft seal 150 is fixed to the inner diameter of the housing 110, and includes circumferential direction seals 152 and 154, and an axial direction seal 156. The circumferential direction seals 152 and 154 seal between the housing 110 and the shaft 130, and may be formed of a ring-shaped plastic material or rubber material. As shown in FIG. 6, in the present embodiment, the circumferential direction seals 152 and 154 may be arranged to face each other as a pair between the pair of bearings 140. The axial direction seal 156 may be formed of a plastic material or a rubber material, and may be provided in an axial direction of the shaft 130 to be perpendicular to the circumferential direction seals 152 and 154 between the pair of circumferential direction seals 152 and 154. As shown in FIG. 9, the axial direction seal 156 may seal the pressure port 112A and the vacuum port 112B not to communicate with each other. In the current embodiment, the pressure port 112A may be arranged in an area corresponding to a space between the axial direction seals 156, and the one or more vacuum ports 112B may be arranged in other areas.

The circumferential direction seals 152 and 154 and the axial direction seal 156 may be separately formed and combined via bonding or forcible combination, or may be integrally molded. As shown in FIG. 11, for example, the circumferential direction seals 152 and 154 may include an elastic member 153 inserted into a plastic seal main body. The elastic member 153 may be provided as an O-ring. Also, the axial direction seal 156 may be provided as a lip seal. Also, according to an embodiment, at least one of the circumferential direction seals 152 and 154 and the axial direction seal 156 may be provided as a mechanical seal or a magnet.

Meanwhile, the present embodiment has been described with an example in which the seal main bodies 152 and 154 include a recess opened in the axial direction of the shaft 130 and the elastic member 153 is provided in the recess, but according to another embodiment, the recess may be provided towards the housing 110 and the elastic member 153 may be provided on a surface facing the housing 110. In this case, the elastic member 153 is provided on one surface of the seal main body contacting the housing 110, and thus the circumferential direction seals 152 and 154 may further pressurize the shaft 130.

Figure 12:
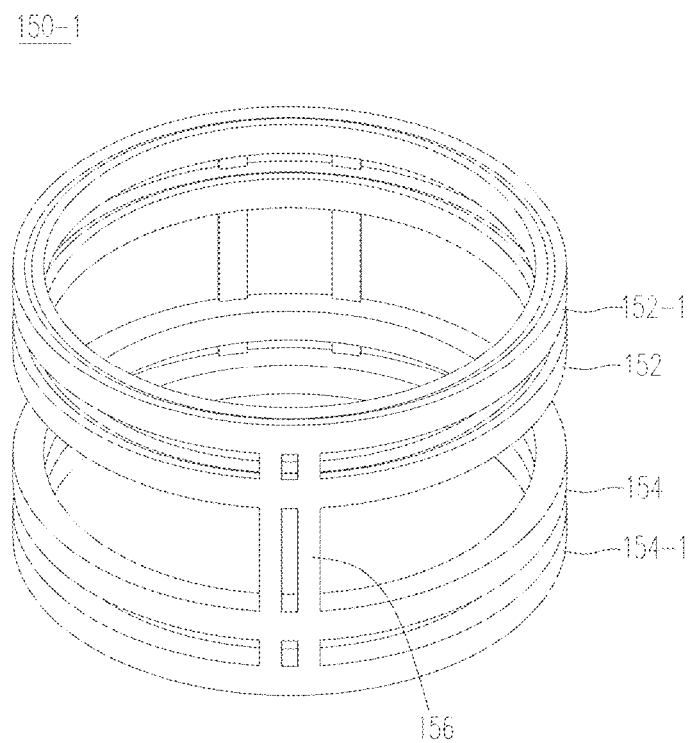
FIG. 12 is a view showing a rotation shaft seal according to another embodiment of the disclosure.

FIG. 12 is a view showing a rotation shaft seal according to another embodiment of the disclosure.

Referring to FIG. 12, a rotation shaft seal 150-1 according to another embodiment of the disclosure is similar to the rotation shaft seal 150 of FIG. 11, except that pairs of circumferential direction seals 152, 152-1, 154, and 154-1 arranged at an upper portion and a lower portion, respectively, are provided. A circumferential direction seal may be damaged due to friction or the like according to long-term use. In the present embodiment, the plurality of circumferential direction seals 152, 152-1, 154, and 154-1 arranged at the upper portion and the lower portion may be provided such that, even when any one circumferential direction seal is damaged, another circumferential direction seal without damage may stably perform a sealing function. Accordingly, a life of the component transfer device 10 may be extended.

According to a component transfer device according to the embodiment described above, a component may be accurately transferred by using vacuum adsorption.

Also, a multi-layered ceramic capacitor (MLCC) or various chips may be precisely transferred by using vacuum adsorption, or a component in a sheet form, such as a secondary battery finishing tape, may be adsorbed without a wrinkle and precisely transferred.

According to a rotation shaft seal according to the embodiment described above, while a shaft is rotating inside a housing, a space between the shaft and the housing may be sealed from the outside while areas of the space between the shaft and the housing may be separately sealed such that the areas may be divided into a vacuum area or a pressurized area.

Hereinabove, the disclosure has been described by specific matters such as specific elements and limited embodiments and drawings, but these are provided only to help more general understanding of the disclosure. The disclosure is not limited to the above embodiments and anyone with ordinary knowledge in the technical field to which the disclosure belongs may make various modifications and changes from these descriptions.

Therefore, the spirit of the disclosure should not be determined limitedly based on the above-described embodiments, and not only the appended claims but also all ranges equivalent to or equivalently changed from the claims are within the scope of the spirit of the disclosure.

What is claimed is:

1. A component transfer device comprising:
a hollow housing provided with, along an outer diameter thereof, one or more fluid ports forming vacuum or pressure;
a shaft provided rotatably with respect to the housing inside the housing, and provided with, on an outer diameter thereof, a plurality of communication holes for selectively communicating with the one or more fluid ports according to a rotation location; and
a roller fixed to the shaft and rotating together with the shaft, and provided with, on an outer diameter thereof, a plurality of roller holes communicating in response to locations of the plurality of communication holes,
wherein a component is adsorbed or separated according to rotation of the roller,
wherein the one or more fluid ports comprise one or more pressure ports and one or more vacuum ports,
a roller hole of the roller communicating with the one or more vacuum ports adsorb the component to the roller, and
a roller hole of the roller communicating with the one or more pressure ports separates the component from the roller via pressure, and
wherein the housing comprises an area expansion groove communicating with the one or more pressure ports or the one or more vacuum ports and provided along an inner circumferential surface of the housing.

2. The component transfer device of claim 1, further comprising a bearing for rotatably supporting the shaft in the housing.

3. The component transfer device of claim 1, wherein a length of the area expansion groove along the inner circumferential surface of the housing is determined according to a location and length of a portion adsorbing the component.

4. The component transfer device of claim 1, wherein a rotation shaft seal is provided between the shaft and the housing such that pressure is not leaked through the one or more fluid ports.

5. The component transfer device of claim 4, wherein the rotation shaft seal is fixedly provided at an inner diameter of the housing and comprises:
a pair of circumferential direction seals sealing a space between the housing and the shaft; and
an axial direction seal provided in an axial direction of the shaft to be perpendicular to the pair of circumferential direction seals between the pair of circumferential direction seals, and sealing one or more pressure ports and one or more vacuum ports such as not to communicate with each other.

6. The component transfer device of claim 5, wherein the pair of circumferential direction seals and the axial direction seal are formed of a plastic material or a rubber material.

7. The component transfer device of claim 5, wherein the pair of circumferential direction seals and the axial direction seal are integrally molded.

8. The component transfer device of claim 5, wherein the pair of circumferential direction seals comprise a seal main body and an elastic member inserted into the seal main body.

9. The component transfer device of claim 8, wherein the elastic member is provided on one surface of the seal main body contacting the housing such that the pair of circumferential direction seals pressurize the shaft.

10. The component transfer device of claim 5, wherein at least one of the pair of circumferential direction seals and the axial direction seal is provided as a mechanical seal or a magnet.

\* \* \* \* \*